March 18, 1941.　　　A. MÖHRLE ET AL　　　2,235,325
GAS-TIGHT JOINT BETWEEN THE ELECTRODE AND THE CERAMIC BODY
Filed April 25, 1939
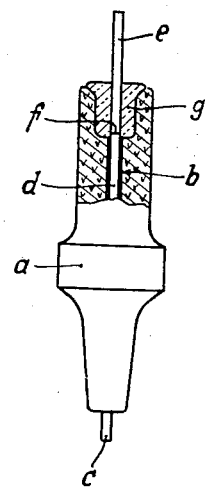
Inventors
Artur Möhrle
Edgar Sachs
by Roy F. Stewart
their attorney Patented Mar. 18, 1941

2,235,325

UNITED STATES PATENT OFFICE 2,235,325

GAS-TIGHT JOINT BETWEEN THE ELECTRODE AND THE CERAMIC BODY

Artur Möhrle, Mohringen, and Edgar Sachs, Korntal, Germany, assignors to Robert Bosch Gesellschaft mit beschränkter Haftung, Stuttgart, Germany Application April 25, 1939, Serial No. 269,990
In Germany April 27, 1938

8 Claims. (Cl. 123—169)

It is known for a gas-tight joint to be made in a sparking plug between an insulating element and an electrode running through it by soldering the electrode to a metal surface disposed on the insulating element. It may happen in many cases however that the solder does not hold sufficiently firmly. To increase the mechanical grip it has been suggested that both the jacket and the electrode be provided with a thread. The larger examples of this type of plug are liable however to breakage due to the drawing tight of the central electrode, which is necessary to increase the gas-tight qualities of the plug. In the smaller sizes the provision of a thread in the jacket and on the electrode is very costly, if indeed it can be effected at all.

The present invention relates to a threadless, gas-tight joint between an insulating element and a central electrode passing through it, which joint is efficient under changing temperature conditions and largely insusceptible to mechanical strains. According to the invention, the electrode, which is made from a nickel alloy, is welded to a molybdenum wire and then cemented in the ceramic body only so far that, at the head of the insulating element, there still remain about 3 to 6 mm. of the molybdenum wire free of the cement. The actual electrode is in the foot of the plug and the part consisting of molybdenum or molybdenum alloy in the head of the plug. It is advisable to place the welded point of the electrode wire so that it coincides approximately with the end of the cement, serving to hold the electrode fast in the insulating element. Some known substance can be used as cement. It should have an expansion to heat, corresponding to a great extent, to that of the electrode wire and of the insulating element. The cement is next dried at 300° C. in the usual manner, in order finally to remove all water. Finally the ceramic body is fused to the electrode with hard glass, so as to form a gas-proof joint. The molybdenum wire makes possible a good, flawless joint between the hard glass and the metal, as its expansion due to heat is similar to that of the hard glass. ($3.5$ to $4.8 \times 10^{-6}$). In place of molybdenum or a molybdenum alloy any other metal wire, e. g. nickel iron wire may be used, so long as it has an expansion due to heat roughly corresponding to that of hard glass.

The invention is described with reference to the drawing, which shows a sparking plug, partly in section.

$a$ is a ceramic body with a hole $b$ there-through which runs a central electrode $c$ which is cemented to the insulating body. According to the invention the central electrode consists of a nickel alloy wire $d$ which is welded to a molybdenum wire $e$ at the point $f$. When the central electrode has been cemented in, the electrode element $e$ is fused with hard glass $g$ so as to form a gas-tight joint with the ceramic mass.

The joint in accordance with the invention can be used in all cases where it is desired to insert electrodes in such a manner that the joint is gastight and efficient at all temperatures. This is especially so in the case of sparking plugs, where the liability of the smaller grades of plug sleeve to break across is removed by the use of the above invention, and the uneconomical practice of cutting a thread in the sleeve and on the electrode, where that was possible is avoided.

We declare that what we claim is:

1. A joint between an electrode and an insulating body, which is gas tight and effective under changing temperature conditions, comprising a central electrode, an insulating element into which said central electrode is cemented, a wire welded to said central electrode, and a hard glass seal between said wire and said insulating body, said wire being of approximately the same heat expansibility as said hard glass seal.

2. A joint between an electrode and an insulating body, which is gas tight and effective under changing temperature conditions comprising a central electrode, an insulating element into which said central electrode is cemented, a wire welded to said central electrode, and a hard glass seal between said wire and said insulating body, said wire being made of molybdenum.

3. A joint between an electrode and an insulating body, which is gas tight and effective under changing temperature conditions, comprising a central electrode, an insulating element into which said central electrode is cemented, a wire welded to said central electrode, and a hard glass seal between said wire and said insulating body, said wire being made of a molybdenum alloy having substantially the same expansion under heat as said hard glass seal.

4. A joint between an electrode and an insulating body which is gas tight and effective under changing temperature conditions, comprising a central electrode, an insulating element into which said central electrode is cemented, a wire welded to said central electrode, and a hard glass seal between said wire and said insulating body, said wire being of approximately the same heat expansibility as said hard glass seal, and said electrode having the same heat expansibility as said cement and said insulating body.

5. A joint between an electrode and an insulating body, which is gas tight and effective under changing temperature conditions, comprising a central electrode, an insulating element into which said central electrode is cemented, a wire welded to said central electrode, and a hard glass seal between said wire and said insulating body, said wire being made of molybdenum and said electrode being made of a nickel alloy.

6. A sparking plug comprising a central electrode of nickel alloy, an insulating element into which said electrode is cemented, a molybdenum wire welded to said central electrode, and a hard glass seal between said wire and said insulating body.

7. A joint between an electrical conductor and an insulating body, which is gas tight and effective under changing temperature conditions, comprising a central conductor, a ceramic insulating element in which said central conductor is secured, a second conductor secured to one end of said central conductor, and a hard glass seal between said second conductor and said ceramic insulator, said second conductor having substantially the same expansion under heat as said hard glass seal.

8. A joint between an electrical conductor and an insulating body, which is gas-tight and effective under changing temperature conditions, comprising a ceramic insulating element having a restricted central opening terminating in an enlarged pocket opening into one end of said element, a central conductor secured in said central opening of said element and having one end terminating substantially at the junction of said central opening and said pocket, a second conductor secured to said end of said central conductor and arranged in said pocket, and a hard glass seal arranged in said pocket and between said second conductor and said element, said second conductor having substantially the same expansion under heat as said hard glass seal.

ARTUR MÖHRLE.
EDGAR SACHS.